(12) United States Patent
Potter

(10) Patent No.: US 6,360,315 B1
(45) Date of Patent: Mar. 19, 2002

(54) METHOD AND APPARATUS THAT SUPPORTS MULTIPLE ASSIGNMENT CODE

(75) Inventor: Terence M. Potter, Austin, TX (US)

(73) Assignee: Intrinsity, Inc., Austin, TX (US)

( * ) Notice: Subject to any disclaimer, the term of this patent is extended or adjusted under 35 U.S.C. 154(b) by 0 days.

(21) Appl. No.: 09/373,516

(22) Filed: Aug. 12, 1999

Related U.S. Application Data

(60) Provisional application No. 60/119,340, filed on Feb. 9, 1999.

(51) Int. Cl.$^7$ .................................. G06F 9/312
(52) U.S. Cl. ................ 712/219; 712/216; 712/228; 712/241; 712/244
(58) Field of Search ................. 712/216, 217, 712/218, 219, 224, 225, 228, 241, 244

(56) References Cited

U.S. PATENT DOCUMENTS

| | | | |
|---|---|---|---|
| 4,970,641 A | | 11/1990 | Hester et al. |
| 5,201,057 A | * | 4/1993 | Uht ............................ 712/18 |
| 5,325,495 A | * | 6/1994 | McLellan .................... 712/219 |
| 5,588,113 A | * | 12/1996 | Johnson ....................... 714/15 |
| 5,682,492 A | | 10/1997 | McFarland et al. |
| 6,035,122 A | * | 3/2000 | Ando ............................ 717/5 |

* cited by examiner

Primary Examiner—William M. Treat
(74) Attorney, Agent, or Firm—Booth & Wright, LLP; Matthew J. Booth

(57) ABSTRACT

The present invention is an apparatus that supports multiple assignment code, comprising a register that may be assigned multiple values, instructions that receive a value and dispatch a result, a first queue that stores the results of an instruction during a pipeline stall, and a second queue that stores the state of the register when an interrupt is taken. The value assigned to a register may be available for processing only after a latency period has passed. The value received by an instruction from a register is the most recent value assigned to the register for which the latency period has passed. The first queue eliminates the need for global stalls in the context of various pipeline implementations. The second queue allows for interruptibility. The present invention further comprises a mode where the software identifies that it does not intend to exploit multiple assignment code.

15 Claims, 5 Drawing Sheets

METHOD AND APPARATUS THAT SUPPORTS MULTIPLE ASSIGNMENT CODE

This application claims the benefits of the earlier filed U.S. Provisional Pat. App. Ser. No. 60/119,340, filed Feb. 9, 1999, which is incorporated by reference for all purposes into this application.

BACKGROUND OF THE INVENTION

1. Field of the Invention

The present invention relates to the field of computers, and more specifically to techniques for pipeline control in processors.

2. Description of the Related Art

The ever-growing requirement for high performance computers demands that computer hardware architecture maximize software performance. One technique for improving computer performance is to increase the number of instructions executed per clock cycle by the processor ("processor throughput"). Processor throughput may be increased by pipelining, where the processor is divided into separate processing stages (collectively termed a "pipeline"). Whereas early computer processors executed only one instruction at a time, pipelined designs allow a new instruction to begin execution before a previous instruction is finished executing, increasing the rate at which instructions can be executed.

Two common types of pipeline operand management that can be implemented in a processor are "protected" and "unprotected". They each have an effect on the portability of code and implementation difficulty. Historically, general-purpose microprocessors have implemented protected pipelines, because the original microprocessors were not pipelined and executed code serially. For code compatibility, later designs were required to maintain this "serial execution model" and implement protected pipelines. Digital signal processors, on the other hand, generally did not migrate code from one generation to the next, so they tend to implement unprotected pipelines.

Software for protected pipelines is written as if each instruction is executed in its entirety before the next one is started. This means that hardware must detect dependencies between instructions in order to correctly execute them in parallel. Interrupts (e.g., page faults or divide-by-zero) and unknown latencies (e.g., cache misses or data-dependent instruction timing) are handled through hardware interlocks that track register targets and register sources. In this scheme, once an instruction is issued, it can write its results at anytime thereafter, because all subsequent instructions expect to see its result, and no subsequent instructions expect to see the prior value of that result register.

The unprotected pipeline approach moves complexity out of the hardware and into the software by requiring that the code understand how instructions are executed in parallel and how long each instruction takes to produce a result, and also that the code handle interrupts and unknown latencies. Thus, rather than tracking dependencies between instructions, the hardware simply assumes there are not any. This saves a significant amount of hardware and exposes the operation of the pipeline to the programmer.

Efficient software can be written for an unprotected pipeline. If a register-writing instruction requires more than one clock cycle to complete, a register may be read after a write to it is initiated, but before that write actually occurs. Since the hardware is not checking dependencies between instructions as in protected pipelines, it can intentionally read "stale" values from the register file before they are updated. The ability to read "stale" values provides two benefits. First, the program gets to see a slightly larger register set for a short period of time, and second, the scheduling of operands in loops can be made simpler (which reduces code size). Multiple Assignment Code is code that relies on reading these "stale" values from registers.

Multiple Assignment Code

Multiple assignment code can increase the apparent size of a register file and decrease the size of iterative code loops. The following example in TABLE 1 shows a typical case where a value is loaded into register R0 and then added to another value, contained in register R1. (In all of the following examples, the LOAD instructions require a two cycle latency period to write their result into the register file, and all other instructions require one cycle to write their result.)

TABLE 1

| LOAD | (address) | -> R0; | cycle 1 |
|---|---|---|---|
| ADD | R0, R1 | -> R2; | cycle 2 |

FIG. 1A illustrates a protected pipeline stalling an instruction until a particular value is available. A protected pipeline would detect that register R0 is not available until cycle 3 (because of the latency) and stall the ADD until it is available 70. FIG. 1B illustrates an unprotected pipeline using a "stale value". An unprotected pipeline relies on the code itself to properly schedule operand accesses. In this case, because there is no cycle (caused by a non-operation or other instruction) between the LOAD and ADD, the value of R0 before the end of the latency period, the "stale value", will be used by the ADD instruction 72.

A protected pipeline experiences inefficiency by introducing stalls, and an unprotected pipeline experiences inefficiency by including non-operation instructions. If an unprotected pipeline is to appear to operate as a protected pipeline does, it must assume outstanding register results make registers "off limits" until the result has been written. Accordingly, any LOAD requires one register to be allocated the following cycle simply to keep track of where the result is written; for loads with more than one additional cycle of latency and multiple pipelined loads, more than one such register is required. This is not a big problem with two cycle latency loads, but if the latency increases, then so does the number of registers required.

LOAD instructions on the Texas Instruments TMS320C62XX family of processors require five cycles of latency, or at most four registers for scheduling the return of these results. With a register file containing 32 entries, the incremental advantage is to make the register file appear to be about 13 percent larger (four more registers). Future designs, moreover, are likely to increase operation latencies, and not just for LOAD instructions. It is probable that all operations will require more than one cycle of latency, and LOADs could require as many as a dozen. It should be obvious that, without support for a multiple assignment code, a register file would have to be unreasonably large just to schedule operands. Accordingly, what is needed is an apparatus and method that supports multiple assignment code to control a processor pipeline and allows for pipeline stalls and interruptions.

SUMMARY

The present invention is an apparatus and method that supports multiple assignment code, comprising a register that may be assigned multiple values, instructions that receive a value and dispatch a result, a stall queue that stores the results of an instruction during a pipeline stall, and an interrupt queue that stores the state of the register when an interrupt is taken. The value assigned to a register may be available for processing only after a latency period has passed. The value received by an instruction from a register is the most recent value assigned to the register for which the latency period has passed. The result of an instruction that requires an N unit latency period appears in a register file before the Nth following group of instructions are dispatched, and after the group of instructions immediately preceding the present one. The stall queue eliminates the need for global stalls in the context of various pipeline implementations. The interrupt queue allows for interruptibility.

The present invention further comprises a mode where the software identifies that it does not intend to exploit multiple assignment code.

BRIEF DESCRIPTION OF THE DRAWINGS

To further aid in understanding the invention, the attached drawings help illustrate specific features of the invention and the following is a brief description of the attached drawings.

DETAILED DESCRIPTION OF THE INVENTION

The present invention comprises an apparatus and method that supports multiple assignment code and that controls a pipeline of a processor, comprising a register that may be assigned multiple values and instructions that receive a value and dispatch a result. This disclosure describes numerous specific details that include specific structures, their arrangement, and functions in order to provide a thorough understanding of the present invention. One skilled in the art will appreciate that one may practice the present invention without these specific details.

Multiple assignment code describes a way of controlling a microprocessor pipeline without using dependency checking hardware. Such pipelines are uncommon today, but are becoming more popular, and the multiple assignment code control model offers advantages in register usage and code size. The present invention supports multiple assignment code without significantly impacting the maximum clock rate of the pipeline. Additionally, the present invention allows multiple assignment code to be interruptible. And, the use of a stall queue and an interrupt queue allow for more efficient use of hardware resources.

The present invention gives a designer a specific kind of freedom in implementing a specific architecture by allowing the designer to avoid specifying a minimum and maximum number of cycles for an operation (and/or an instruction) to complete its execution. Rather, the present invention allows the designer to define that the result of an operation (and/or an instruction) appear before or after an event. This freedom allows a designer to vary the actual cycle-latency of an operation (and/or an instruction) to fit the requirements of the specific implementation (be they performance, power, or size, etc . . . ) without impacting user code which depends on the specific behavior of the unprotected pipeline. This freedom is important when moving from one application to another, or from one technology to another.

Figure 1A:
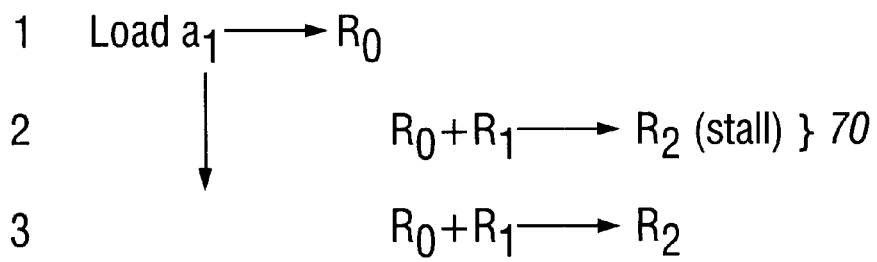
FIG. 1A illustrates a protected pipeline stalling an instruction until a particular value is available.
Figure 1B:
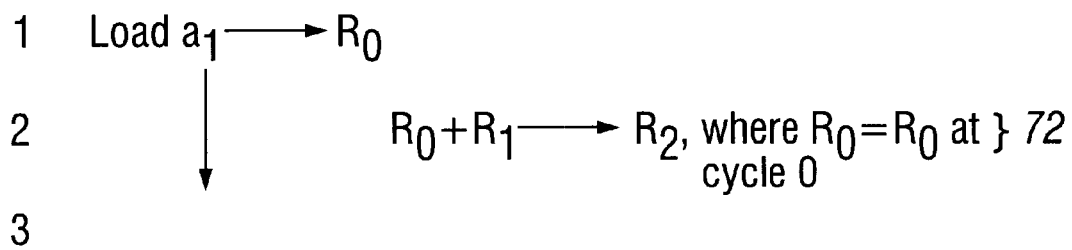
FIG. 1B illustrates an unprotected pipeline using a "stale value".
Figure 2:
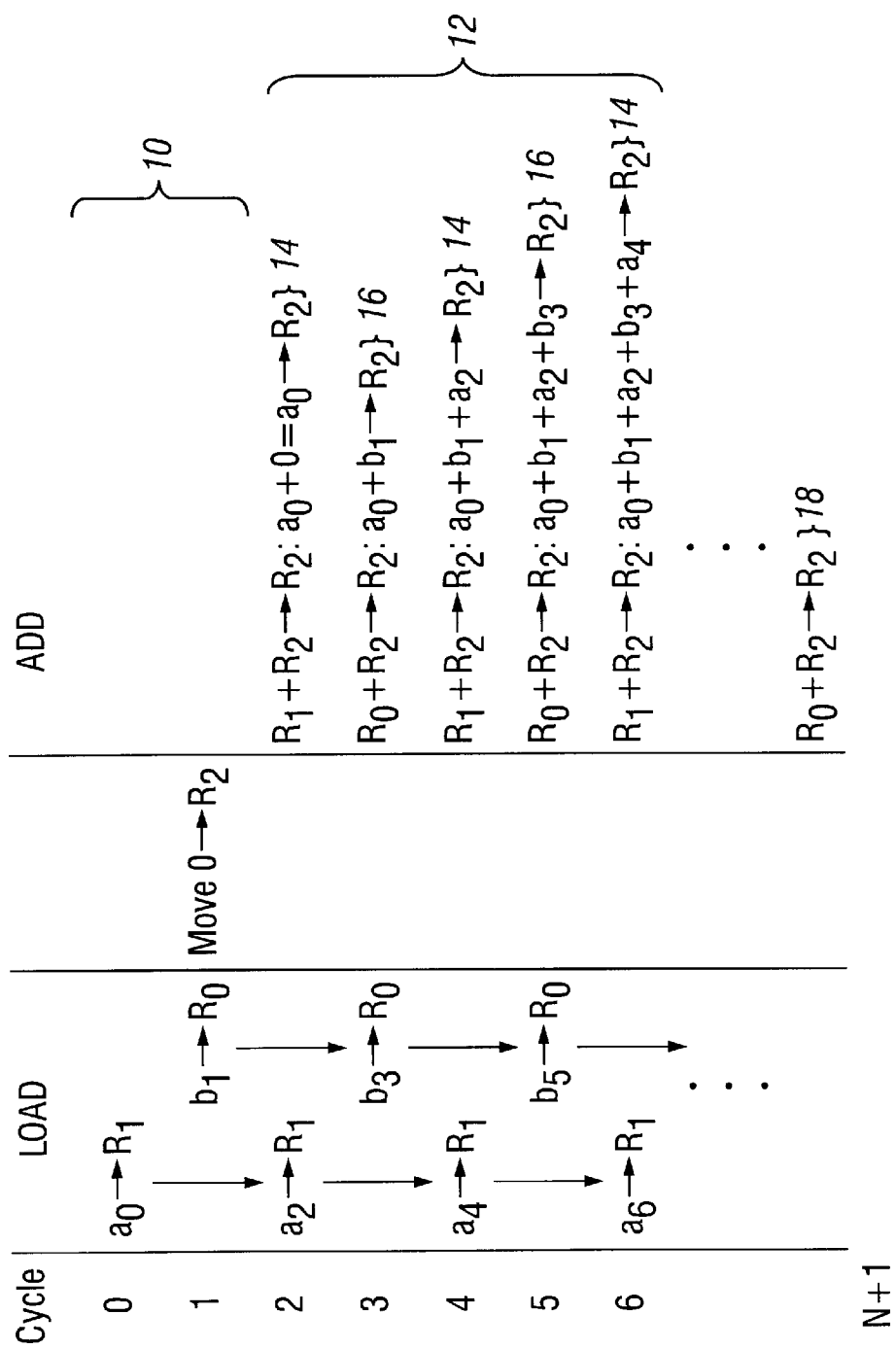
FIG. 2 is an example of a number of memory locations being read and summed together.

TABLE 2 and FIG. 2 is one example of a number of memory locations being read and summed together where TABLE 2 is a sample code fragment for the reading and summing of the memory locations illustrated in FIG. 2.

TABLE 2

|        | LOAD | (address) | -> R1; | cycle 0 |
|--------|------|-----------|--------|---------|
|        | LOAD | (address) | -> R0; | cycle 1 |
|        | MOV  | 0         | -> R2; | cycle 1 |
| label: | LOAD | (address) | -> R1; | even cycles 2 to N |
|        | ADD  | R1, R2    | -> R2  |         |
|        | LOAD | (address) | -> R0; | odd cycles 3 to N |
|        | ADD  | R0, R2    | -> R2  |         |
|        | JUMP | label     |        |         |
|        | ADD  | R0, R2    | -> R2; | cycle N + 1 |

The example in FIG. 2 comprises an initial group of instructions 10, a loop 12 starting with "label" comprising a group of instructions for even clock cycles 14 and a group of instructions for odd clock cycles 16, and a final group of instructions 18. The loop 12 is executed N−1 times, and each iteration reads two addresses and sums these two values into register R2. After exiting the loop 12, one additional add is performed 18.

There are two groups of instructions in the loop because the LOAD instruction requires two clock cycles to return its value. The value that is loaded by the first group of instructions in the loop is not present in the second group of the iteration; it is not present until the next iteration of the loop. The first time the first ADD in the loop is performed it is merely adding zero, but once the loop is "primed", all instructions perform meaningful work. The actual addition of each value is performed by the same group of instructions as the LOAD, but in the following iteration. In other words, the register numbers are used to feed operations from one instruction to the next. R1 is the means by which the LOAD instruction sends the loaded value to the following iteration's first ADD instruction. We do not particularly care that register R1 is used, or that a register was used at all. If we had a compound instruction that loaded and added directly into R2, our code would be just as functional.

The use of multiple register numbers to unroll loops simply to track the means by which one instruction feeds later instructions is artificial. All that matters is that we have a deterministic means of conveying this information to the hardware. If one understands how the hardware operates, one can better leverage its behavior to accomplish the objectives.

Figure 3:
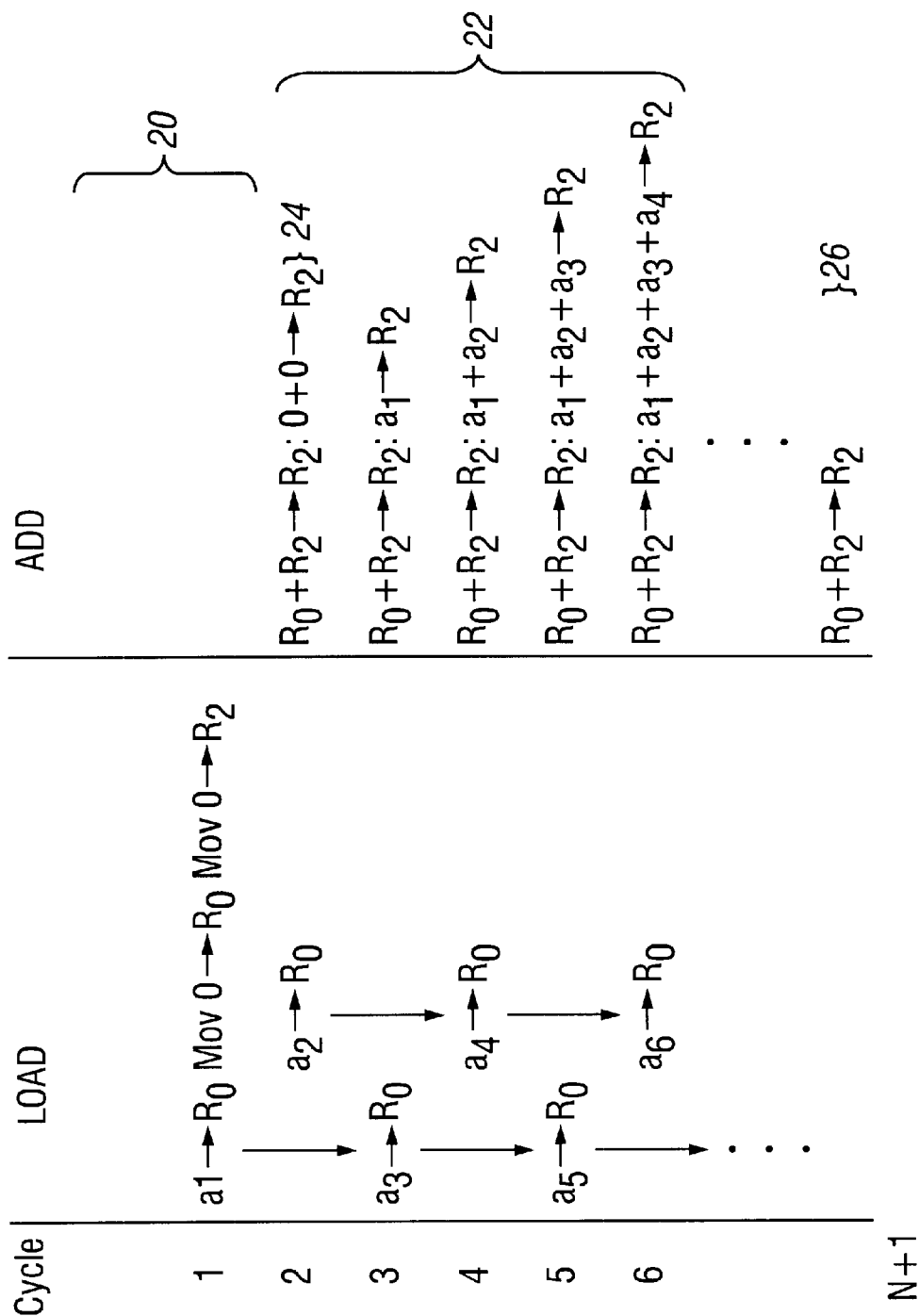
FIG. 3 is an example of a number of memory locations being read and summed together using the present invention.

TABLE 3 and FIG. 3 is an example of a number of memory locations being read and summed together using the present invention where TABLE 3 is a sample code fragment for the reading and summing of the memory locations illustrated in FIG. 3.

TABLE 3

|  | LOAD | (address) | -> R0; | cycle 1 |
|---|---|---|---|---|
|  | MOV | 0 | -> R0 |  |
|  | MOV | 0 | -> R2 |  |
| label: | LOAD | (address) | -> R0; | cycle 2 to N |
|  | ADD | R0, R2 | -> R2 |  |
|  | JUMP | label |  |  |
|  | ADD | R0, R2 | -> R2; | cycle N + 1 |

The example in FIG. 3 comprises an initial group of instructions 20, a loop 22 starting with "label" comprising a group of instructions for both even and odd cycles 24, and a final group of instructions 26. In this example, the loop 22 will iterate twice as many times, but instead of two instruction groups in the loop there is only one 24. The first iteration of the loop performs a meaningless add, but each additional iteration does an add of the loaded value from two iterations earlier. One fewer register is required, and the amount of code is reduced. For a larger group of instructions, each of which has more than one cycle of latency, a loop must be made up of many instruction groups to properly track operands. Multiple assignment programming avoids this, reducing code size as well as the demand on the register file.

Architectural Definition

An unprotected pipeline leaves the definition of when a register is updated undefined. Each version of a processor could have different operation latencies for each instruction, meaning that there is no consistency from one processor generation to the next. This is unacceptable if code migration is supported across multiple parts. As a result, one must define the architectural appearance of multiple assignment code.

A protected pipeline defines results to be written before they are read by following instructions. An unprotected pipeline defines results to be written N cycles after the dispatch of the corresponding instructions. The architectural definition of the present invention avoids "cycles" by defining the appearance of an instruction before or after an event, instead of before or after a specific number of clock cycles. While one version of a chip, or the same chip in one environment, may require one number of cycles to execute through a particular piece of code, another version of the chip or the same chip in another environment may require a different number of cycles, such that the actual cycle behavior of a part cannot be predicted. (In general, it is very bad practice to fix the number of cycles to perform an operation. Instead, minimums and maximums are defined to provide flexibility to hardware implementations). Accordingly, the present invention defines the result of an instruction that requires N units of latency to appear in the register file before the instructions in the Nth following group are dispatched (read their input operands), and after the group immediately preceding this one.

Handling Pipeline Stalls

Pipeline stalls are an important tool for circumventing performance problems. For example, if an instruction cannot complete during its defined latency (in cycle count), then clock cycles must be added without changing the instruction's apparent latency. Thus, instruction latency should not be defined in terms of clock cycles. The definition of the present invention redefines this latency in terms of instruction group dispatches, freeing clock cycles to be added as necessary.

The implementation of pipeline stalls requires a stall queue to store the instruction results and to eliminate the need for global stalls. Since results with an N-group latency are not written into the register file until just before the Nth following group's dispatch, there are situations where the first group is dispatched and completes execution in the pipeline, but the following group is prevented from dispatching because of a stall. A stall queue is needed to keep the result until the appropriate group is dispatched. The greater the latency of the first instruction, the deeper this queue needs to be. If the latency is N cycles, N−1 queue entries are needed because N−1 high latency instructions could have completed execution before the following dispatch group's stall is released. The stall queue also eliminates the need to stall the entire pipeline when stall conditions are encountered. Instead, results are simply queued, while the execution units are allowed to drain.

Figure 4:
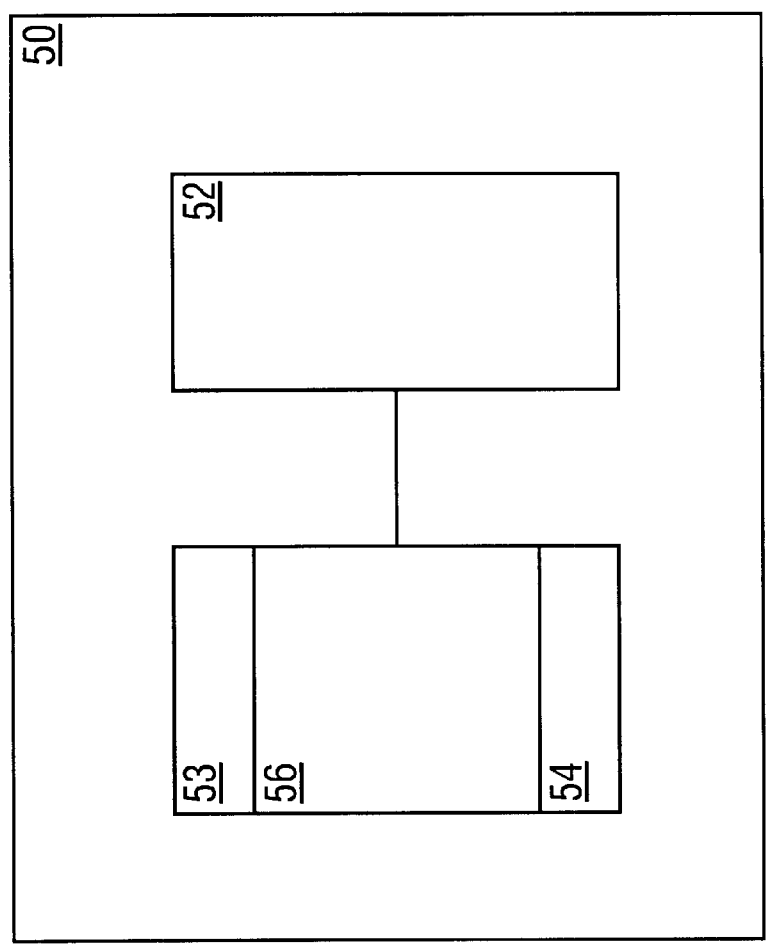
FIG. 4 illustrates a processor using a queue in association with a pipeline to save the result of an instruction group.

FIG. 4 illustrates a processor 50 using a stall queue 54 in association with a pipeline 52 to save the result of an instruction group. By physically locating the stall queue 54 adjacent to the read ports of the register file 56, it is possible to bypass results from it when necessary. While the stall queue 54 may have many results, only one of these results is 'retired' to the register file 56 each cycle. This means it is not necessary to have access to every value in the queue 54, just the one which is to be written. (Multiple execution units may cause multiple results to be visible each cycle). In other words, the presence of the stall queue supporting a 32-entry register file does not allow access to more than 32 registers. It simply changes the apparent values in these registers in a way unfamiliar to the protected mode programmer.

Handling Interrupts

Interruptibility presents a problem with multiple assignment code that stems directly from the definition of writing results into a register file. Since results are written according to the dispatch of a following group of instructions, it is not possible to introduce interrupt routines without changing the following group of instructions. There are two solutions to this problem. The first, which is clearly unacceptable, is to require the programmer to write code that either does not employ multiple assignment code, or avoids it for frequent windows where the hardware can detect and enable interrupts.

The alternative is to allow interrupts and to provide a structure that stores the state of the processor when the interrupt is taken. The state differs from the protected pipeline state because there may be one or more register writes which have not yet occurred. While the programmer can see just 32 registers at a time, there may be outstanding register file writes that will continue to occur even if the program is dispatching no more than no-operation instructions. These outstanding writes can not be allowed to complete before the interrupt is taken because following instructions may depend on stale values, and they cannot be discarded because the program would not operate properly. Consequently, the interrupt handler must have access to the outstanding register file writes and must also save and restore the outstanding writes.

An interrupt queue that allows interruptibility 53 is a novel use of a retire buffer typically found in out-of-order pipelines. Rather than using the interrupt queue to re-order results to match the order in which the programmer expects them to be written, the interrupt queue adjusts the cycle where results are written. The results are retired to match the cycle when the corresponding group which expects to see the results is dispatched. As such, the interrupt queue need only operate in a first-in, first-out mode. Also, since at most one result per write path becomes available each cycle, and that result is visible to all subsequent instructions (until it is dead), at most one result need be forwarded from the interrupt queue each cycle, and it can then be stored into the register file.

The 'snapshot' of the executing program comprises the present register state, and all the registers that have yet to be updated. Saving the outstanding writes increases the relative cost of taking interrupts, but since interrupts are relatively infrequent, the gain in code efficiency outweighs the cost. Saving the outstanding writes also requires an increase in storage space to account for the queue contents, both the values to be written and the register numbers into which the values are retired.

A mode of the processor where the software identifies that it does not intend to exploit multiple assignment code can be introduced to avoid increasing the cost of interruptibility. In this mode, the interrupt queue can be flushed into the register file rather than saved when an interrupt is encountered. The state must be saved to indicate that the interrupt queue was not saved to prevent a false queue image from being loaded when a return from the interrupt occurs. Note that it is not possible to identify code that does not use multiple assignments when an interrupt occurs because it is necessary to examine instructions that may not have been fetched. It is therefore necessary for the program itself to identify when multiple assignment code is present.

A Typical Computer System

Figure 5:
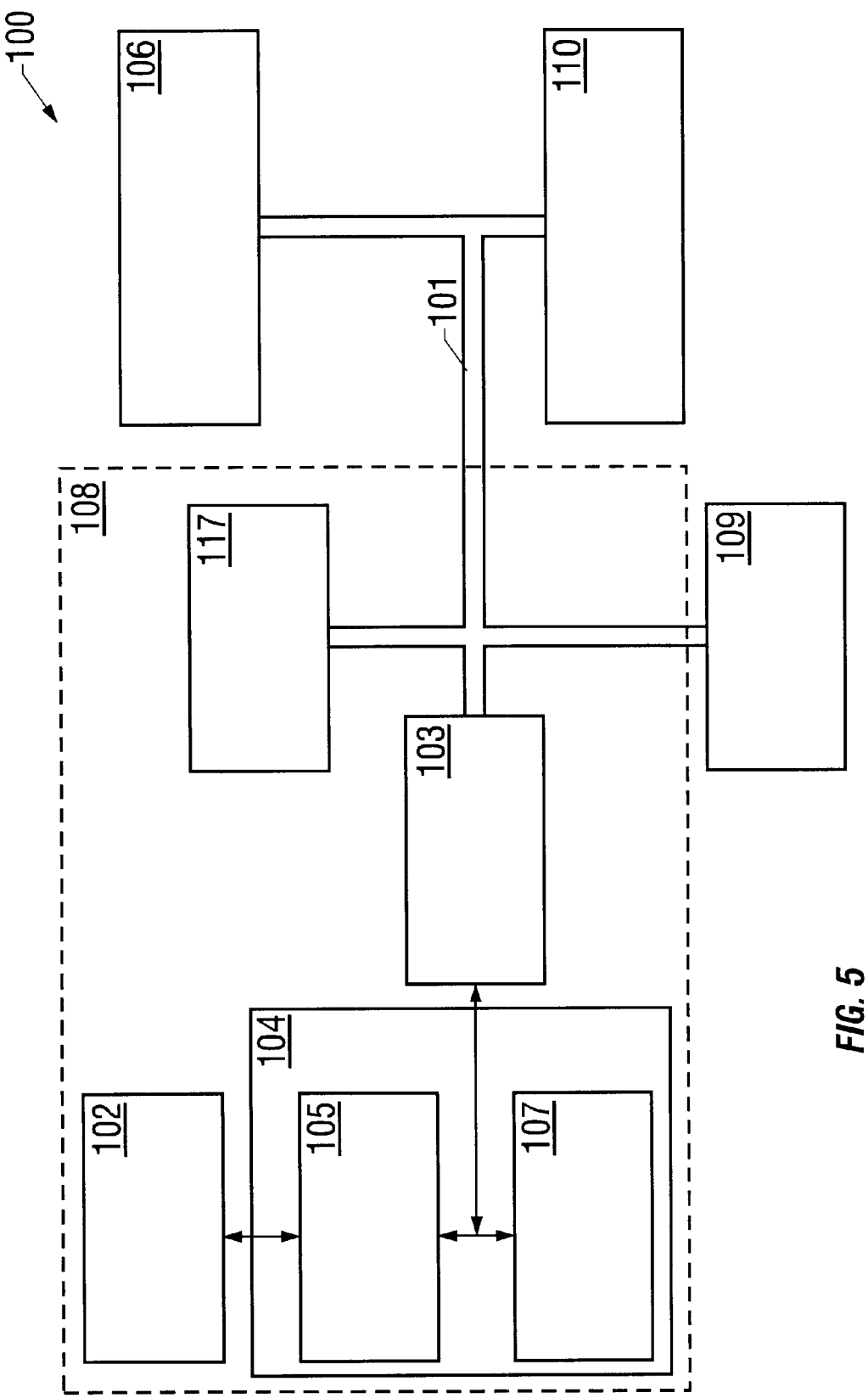
FIG. 5 shows a typical general purpose computer system incorporating a processor in accordance with the present invention.

FIG. 5 shows a typical general purpose computer system 100 incorporating a processor 102 in accordance with the present invention. The computer system comprises an address/data bus 101 for communicating information, a processor 102 coupled with the bus 101 through an input/output (I/O) device 103 for processing data and executing instructions, and a memory system 104 coupled with the bus 101 for storing information and instructions for the processor 102. The memory system 104 comprises, for example, a cache memory 105 and a main memory 107. Cache memory 105 includes one or more levels of cache memory. In a typical embodiment, a processor 102, an I/O device 103, and some or all of the cache memory 105 may be integrated in a single integrated circuit, although the specific components and integration density are a matter of design choice selected to meet the needs of a particular application.

A user I/O device 106 is coupled to the bus 101 and communicates information to and from the other parts of the computer 100. The user I/O device 106 may be a keyboard, a mouse, a card reader, a magnetic or paper tape, a magnetic disk, an optical disk, or other available input device, including another computer. A mass storage device 117 is coupled to the bus 101 and may be implemented using one or more magnetic hard disks, magnetic tapes, CDROMs, large banks of random access memory, or the like. A wide variety of random access and read only memory technologies are available and are equivalent for purposes of the present invention. The mass storage device 117 may include computer programs and data stored therein, and may be configured to be incorporated as a part of the memory system 104.

The processor 102, the I/O device 103, the memory system 104, and the mass storage device 117, are coupled to the bus 101 formed on a printed circuit board and integrated into a single housing as suggested by a dashed-line box 108. The particular components chosen to be integrated into a single housing, however, is based upon market and design choices. Accordingly, it is expressly understood that fewer or more devices may be incorporated within the housing suggested by dashed line 108.

A display device 109 is used to display messages, data, a graphical or command line user interface, or other communications with the user. The display device 109 may be implemented, for example, by a cathode ray tube (CRT) monitor, a liquid crystal display (LCD) or any available equivalent.

The present invention is an apparatus that supports multiple assignment code, comprising a register that may be assigned multiple values, instructions that receive a value and dispatch a result, a stall queue that stores the results of an instruction during a pipeline stall, and an interrupt queue that stores the state of the register when an interrupt is taken. The value assigned to a register may be available for processing only after a latency period has passed. The value received by an instruction from a register is the most recent value assigned to the register for which the latency period has passed. The result of an instruction that requires an N unit latency period appears in a register file before the Nth following group of instructions are dispatched, and after the group of instructions immediately preceding the present one. The stall queue eliminates the need for global stalls in the context of various pipeline implementations. The interrupt queue allows for interruptibility.

The present invention further comprises a mode where the software identifies that it does not intend to exploit multiple assignment code.

Other embodiments of the invention will be apparent to those skilled in the art after considering this specification or practicing the disclosed invention. The specification and examples above are exemplary only, with the true scope of the invention being indicated by the following claims.

I claim the following invention:

1. An apparatus that supports multiple assignment code, comprising:
    a register in a register file that may be assigned multiple values, wherein a value may be available for processing only after a latency period has passed;
    an instruction that receives a value and dispatches a result, wherein said value is the most recent value assigned to said register and for which the latency period has passed, wherein said instruction may dispatch said result only after a latency period, and wherein said instruction may be placed in a group of instructions;
    a stall queue that stores said result of said instruction;
    an interrupt queue that stores the state of said register when an interrupt is taken; and
    a load command that brings information from storage to memory for processing, wherein said load command may assign a value to said register, and wherein said value may be available only after a latency period.

2. The multiple assignment code of claim 1, wherein said result of said instruction that requires an N unit latency period appears in said register file before Nth following group of instructions are dispatched, and after the group of instructions immediately preceding the present one.

3. The multiple assignment code of claim 1, further comprising a mode where the software identifies that it does not intend to exploit multiple assignment code.

4. A system that uses an apparatus that supports multiple assignment code, comprising:
    a register in a register file that may be assigned multiple values, wherein a value may be available for processing only after a latency period has passed;
    an instruction that receives a value and dispatches a result, wherein said value is the most recent value assigned to said register and for which the latency period has passed, wherein said instruction may dispatch said result only after a latency period, and wherein said instruction may be placed in a group of instructions;
    a stall queue that stores said result of said instruction;
    an interrupt queue that stores the state of said register when an interrupt is taken; and a load command that brings information from storage to memory for processing, wherein said load command may assign a value to said register, and wherein said value may be available only after a latency period.

5. The system of claim 4, wherein said result of said instruction that requires an N unit latency period appears in said register file before Nth following group of instructions are dispatched, and after the group of instructions immediately preceding the present one.

6. The system of claim 4, further comprising a mode where the software identifies that it does not intend to exploit multiple assignment code.

7. A method that uses an apparatus that supports multiple assignment code, comprising:

provided a register in a register file that may be assigned multiple values, wherein a value may be available for processing only after a latency period has passed;

providing an instruction that receives a value and dispatches a result, wherein said value is the most recent value assigned to said register and for which the latency period has passed, wherein said instruction may dispatch said result only after a latency period, and wherein said instruction may be placed in a group of instructions;

storing said result of said instruction in a stall queue;

storing in an interrupt queue the state of said register when an interrupt is taken; and providing a load command that brings information from storage to memory for processing, wherein said load command may assign a value to said register, and wherein said value may be available only after a latency period.

8. The method of claim 7, wherein said result of said instruction that requires an N unit latency period appears in said register file before Nth following group of instructions are dispatched, and after the group of instructions immediately preceding the present one.

9. The method of claim 7, further comprising a mode where the software identifies that it does not intend to exploit multiple assignment code.

10. A method to manufacture an apparatus that supports multiple assignment code, comprising:

providing a register in a register file that may be assigned multiple values, wherein a value may be available for processing only after a latency period has passed;

providing an instruction that receives a value and dispatches a result, wherein said value is the most recent value assigned to said register and for which the latency period has passed, wherein said instruction may dispatch said result only after a latency period, and wherein said instruction may be placed in a group of instructions;

coupling a stall queue to said register file, said stall queue stores said result of said instruction;

coupling an interrupt queue to said register file, said interrupt queue stores the state of said register when an interrupt is taken; and providing a load command that brings information from storage to memory for processing, wherein said load command may assign a value to said register, and wherein said value may be available only after a latency period.

11. The method of claim 10, wherein said result of said instruction that requires an N unit latency period appears in said register file before Nth following group of instructions are dispatched, and after the group of instructions immediately preceding the present one.

12. The method of claim 10, further comprising a mode where the software identifies that it does not intend to exploit multiple assignment code.

13. A program storage device readable by a machine, tangibly embodying a program of instructions executable by the machine to perform a method that uses an apparatus that supports multiple assignment code, comprising:

providing a register in a register file that may be assigned multiple values, wherein a value may be available for processing only after a latency period has passed;

providing an instruction that receives a value and dispatches a result, wherein said value is the most recent value assigned to said register and for which the latency period has passed, wherein said instruction may dispatch said result only after a latency period, and wherein said instruction may be placed in a group of instructions;

storing said result of said instruction in a stall queue;

storing in an interrupt queue the state of said register when an interrupt is taken; and providing a load command that brings information from storage to memory for processing, wherein said load command may assign a value to said register, and wherein said value may be available only after a latency period.

14. The program storage device of claim 13, wherein said result of said instruction that requires an N unit latency period appears in said register file before Nth following group of instructions are dispatched, and after the group of instructions immediately preceding the present one.

15. The program storage device of claim 13, further comprising a mode where the software identifies that it does not intend to exploit multiple assignment code.

* * * * *